United States Patent
Liao et al.

(10) Patent No.: US 9,460,668 B2
(45) Date of Patent: Oct. 4, 2016

(54) DISPLAY DEVICE FOR IMPROVING CROSSTALK AFFECTING THREE DIMENSIONAL IMAGE QUALITY AND RELATED METHOD

(71) Applicant: SHENZHEN CHINA STAR OPTOELECTRONICS TECHNOLOGY CO., LTD., Shenzhen, Guangdong (CN)

(72) Inventors: Qiaosheng Liao, Guangdong (CN); Chihming Yang, Guangdong (CN)

(73) Assignee: SHENZHEN CHINA STAR OPTOELECTRONICS TECHNOLOGY CO., LTD. (CN)

( * ) Notice: Subject to any disclaimer, the term of this patent is extended or adjusted under 35 U.S.C. 154(b) by 43 days.

(21) Appl. No.: 14/416,519

(22) PCT Filed: Dec. 29, 2014

(86) PCT No.: PCT/CN2014/095277
§ 371 (c)(1),
(2) Date: Jan. 22, 2015

(87) PCT Pub. No.: WO2016/101290
PCT Pub. Date: Jun. 30, 2016

(65) Prior Publication Data
US 2016/0189639 A1 Jun. 30, 2016

(30) Foreign Application Priority Data

Dec. 24, 2014 (CN) .......................... 2014 1 0814879

(51) Int. Cl.
*G09G 3/36* (2006.01)
*H04N 13/04* (2006.01)
(52) U.S. Cl.
CPC ................ *G09G 3/36* (2013.01); *H04N 13/04* (2013.01); *H04N 13/0413* (2013.01); *H04N 13/0497* (2013.01); *G09G 2320/0209* (2013.01)

(58) Field of Classification Search
CPC .... G09G 3/34; G09G 3/3406; G09G 3/3426; G09G 3/36; G09G 2320/0209; G09G 2320/0646; G09G 2320/0686
USPC .................................. 345/87–102, 204–215
See application file for complete search history.

(56) References Cited

U.S. PATENT DOCUMENTS 8,442,316 B2 * 5/2013 Bassi ...................... G06T 5/008
345/55
8,836,621 B2 * 9/2014 Takatori ............... G09G 3/2014
345/100

(Continued)

FOREIGN PATENT DOCUMENTS

| CN | 101029975 | 9/2007 |
|----|-----------|--------|
| CN | 101650922 | 2/2010 |
| CN | 102413348 | 4/2012 |

*Primary Examiner* — Vijay Shankar
(74) *Attorney, Agent, or Firm* — Kirton McConkie; Evan R. Witt

(57) ABSTRACT

A display device for showing 3D images includes a backlight module and a display section. The backlight module includes n light source units. The display unit section includes n display sections. Upon conditions that a first through kth display section are scanned to receive an image in an current frame, a (k+1)th through an nth display section receives an image in a previous frame, a first through a kth light source unit generate light, and a (k+1)th through nth light source unit do not generate light, the first through the kth display sections display according to the image in the current frame and the light from the first through the kth light source unit, while the (k+1)th display section through the nth display section do not display the image in the previous frame due to the (k+1)th light source unit through the nth light source unit not generating light.

3 Claims, 7 Drawing Sheets

(56) References Cited

U.S. PATENT DOCUMENTS

| | | | |
|---|---|---|---|
| 9,041,641 B2* | 5/2015 | Honbo | G09G 3/3406 345/102 |
| 9,135,864 B2* | 9/2015 | Shields | G09G 3/3406 |
| 2007/0200792 A1 | 8/2007 | Kim et al. | |
| 2008/0018587 A1* | 1/2008 | Honbo | G09G 3/3406 345/102 |
| 2013/0106923 A1* | 5/2013 | Shields | G09G 3/3406 345/690 |
| 2013/0135451 A1 | 5/2013 | Hou et al. | |

* cited by examiner

702 — Upon conditions that the first display section is scanned to receive the image in the current frame, the second display section and the third display section receive the image in the previous frame, the first light source unit generates light, and the second light source unit does not generate light, the first display section displays according to the image in the current frame and the light from the first light source unit, while the second display section and the third display section does not display the image in the previous frame due to the second light source not generating light.

704 — Upon conditions that the first display section and the second display section are scanned to receive the image in the current frame, the third display section receives the image in the previous frame, the first light source unit generates light, and the second light source unit does not generate light, the first display section and the second display section display according to the image in the current frame and the light from the first light source unit, while the second display section and the third display section does not display the image in the previous frame due to the second light source not generating light.

706 — Upon conditions that the first display section, the second display section and the third display section are scanned to receive the image in the current frame, and the first light source unit and the second light source unit generate light, the first display section, the second display section display and the third display section display according to the image in the current frame and the light from the first light source unit and the second light source.

708 — All light source units are turned off.

Fig. 7

DISPLAY DEVICE FOR IMPROVING CROSSTALK AFFECTING THREE DIMENSIONAL IMAGE QUALITY AND RELATED METHOD

BACKGROUND OF THE INVENTION

1. Field of the Invention

The present invention relates to a display device for showing three dimensional (3D) images and a display method, and more particularly, to a display device for improving crosstalk affecting image quality and a display method adopting the device.

2. Description of the Prior Art

Human beings see real-world images using both eyes. Further, the human brain forms so-called 3D images (three-dimensional images) according to differences in spatial distance between two views seen by both eyes from two different angles. A so-called 3D display is designed to create simulations of human visual fields from different angles to help users perceive 3D images when viewing 2D images.

With the development of liquid crystal display technology, 3D display technology makes a progress, too. 3D display technology is classified into glasses-type 3D displays and auto-stereoscopic 3D displays. Glasses-type 3D display technology indicates that users wear specially-made glasses to view 3D images. This kind of technology is a bit harder to promote widely since it requires the users to spend extra money to buy the specially-made glasses. It also makes the users feel less comfortable since the users need to wear the specially-made glasses to view 3D images. As for the auto-stereoscopic 3D display technology, the users can view 3D images without any help of specially-made glasses or other extra equipment. Compared with the glasses-type 3D display technology, the auto-stereoscopic 3D display technology is much more welcomed by the users or businessmen.

Please refer to FIG. 1. FIG. 1 is a schematic diagram of the status of all pixels while a conventional auto-stereoscopic 3D display device 10 is on display. The display device 10 comprises a liquid crystal panel 12 and a grating sheet 14. The liquid crystal panel 12 comprises a pixel matrix. A light-transmitting stripe 14 and a light-shading stripe 14b are formed on the grating sheet 14. The light-transmitting stripe 14a and the light-shading stripe 14b are stripe-like. With the use of the above-mentioned grating sheet 14, left-eye and right-eye images are separated, and then the separated images are reflected into a viewer's left eye L and right eye R, respectively. At frame N, pixels of odd columns are displayed based on left-eye signals, while pixels of even columns are displayed based on right-eye signals. At this time, the order of the left-eye and right-eye signals labels LR, and the grating sheet 14 operates in LR mode. While at frame N+1, pixels of odd columns are displayed based on right-eye signals, while pixels of even columns are displayed based on left-eye signals. At this time, the order of the right-eye and left-eye signals labels RL, and the grating sheet 14 operates in RL mode. Because the liquid crystal panel 12 adopts a row-by-row scanning, column numbers distributed by left- and right-eye signals on the upper part of the liquid crystal panel 12 are different from those distributed on the lower part when the frame of the liquid crystal panel 12 is updated medially. Take FIG. 1 for example, signals received by pixels on the upper part of the liquid crystal panel 12 are in RL mode while signals received by pixels on the lower part are in LR mode. However, if the grating sheet 14 as a disparity barrier is in motion at the same time, the human eye will receive mixed left- and right-eye signals in the end, i.e. crosstalk, thereby affecting the 3D image quality.

SUMMARY OF THE INVENTION

An object of the present invention is to propose a display device and a display method. The backlight module is divided into a plurality of light source units. The backlight module and the display panel are scanned simultaneously. After a display section of the display panel is scanned, the light source unit which the scanned display section corresponds to illuminates and the light source units which other wait-to-be-scanned display sections correspond to do not illuminate. This design helps improve 3D image crosstalk and enhance 3D image quality.

According to the present invention, a display device for showing three dimensional (3D) images, comprises: a backlight module, comprising a first light source unit and a second light source unit, for producing light; and a display unit section, comprising a first display section and a second display section, the first display section overlapping with an illuminating range of the first light source unit, and the second display section overlapping with an illuminating range of the second light source unit. Upon conditions that the first display section is scanned to receive an image in a current frame, the second display section receives an image in a previous frame, the first light source unit generates light, and the second light source unit does not generate light, the first display section displays according to the image in the current frame and the light from the first light source unit, while the second display section does not display the image in the previous frame due to the second light source not generating light. Upon conditions that the first display section and the second display section are scanned to receive the image in the current frame, and the first light source unit and the second light source unit generate light, the first display section and the second display section display according to the image in the current frame and the light from the first light source unit and the second light source.

In one aspect of the present invention, the first display section and the second display section share half an area of the display unit section, respectively.

In another aspect of the present invention, the illuminating range of the first light source unit and the illuminating range of the second light source unit share half the area of the display unit section, respectively.

In still another aspect of the present invention, the display unit section, further comprises a third display section. Upon conditions that the first display section is scanned to receive the image in the current frame, the second display section and the third display section receive the image in the previous frame, the first light source unit generates light, and the second light source unit does not generate light, the first display section displays according to the image in the current frame and the light from the first light source unit, while the second display section and the third display section does not display the image in the previous frame due to the second light source not generating light. Upon conditions that the first display section and the second display section are scanned to receive the image in the current frame, the third display section receives the image in the previous frame, the first light source unit generates light, and the second light source unit does not generate light, the first display section and the second display section display according to the image in the current frame and the light from the first light source unit, while the second display section and the third display section does not display the image in the previous frame due to the second light source not generating light. Upon conditions that the first display section, the second display section and the third display section are scanned to receive the image in the current frame, and the first light source unit and the second light source unit generate light, the first display section, the second display section display and the third display section display according to the image in the current frame and the light from the first light source unit and the second light source.

In yet another aspect of the present invention, the first display section, the second display section, and the third display section share one third of the area of the display unit section, respectively.

According to the present invention, a method of showing three dimensional (3D) images by using a display device is provided. The display device comprises: a backlight module and a display section, the backlight module comprising a first light source unit and a second light source unit, and the display unit section comprising a first display section and a second display section. The method comprises: Upon conditions that the first display section is scanned to receive an image in a current frame, the second display section receives an image in a previous frame, the first light source unit generates light, and the second light source unit does not generate light, the first display section displays according to the image in the current frame and the light from the first light source unit, while the second display section does not display the image in the previous frame due to the second light source not generating light; upon conditions that the first display section and the second display section are scanned to receive the image in the current frame, and the first light source unit and the second light source unit generate light, the first display section and the second display section display according to the image in the current frame and the light from the first light source unit and the second light source.

In one aspect of the present invention, the first display section and the second display section share half an area of the display unit section, respectively.

In another aspect of the present invention, the display unit section further comprises a third display section, and wherein the method further comprises: upon conditions that the first display section is scanned to receive the image in the current frame, the second display section and the third display section receive the image in the previous frame, the first light source unit generates light, and the second light source unit does not generate light, the first display section displays according to the image in the current frame and the light from the first light source unit, while the second display section and the third display section does not display the image in the previous frame due to the second light source not generating light; upon conditions that the first display section and the second display section are scanned to receive the image in the current frame, the third display section receives the image in the previous frame, the first light source unit generates light, and the second light source unit does not generate light, the first display section and the second display section display according to the image in the current frame and the light from the first light source unit, while the second display section and the third display section does not display the image in the previous frame due to the second light source not generating light; upon conditions that the first display section, the second display section and the third display section are scanned to receive the image in the current frame, and the first light source unit and the second light source unit generate light, the first display section, the second display section display and the third display section display according to the image in the current frame and the light from the first light source unit and the second light source.

According to the present invention, a display device for showing 3D images comprises: a backlight module, comprising n light source units, each of the n light source units for producing light, and n being a positive integer; and a display unit section, comprising n display sections and each of the n display sections overlapping with an illuminating range of one of the light source units. Upon conditions that a first display section through a kth display section are scanned to receive an image in an current frame, a (k+1)th display section through an nth display section receives an image in a previous frame, a first light source unit through a kth light source unit generate light, and a (k+1)th light source unit through an nth light source unit do not generate light, the first display section through the kth display section display according to the image in the current frame and the light from the first light source unit through the kth light source unit, while the (k+1)th display section through the nth display section do not display the image in the previous frame due to the (k+1)th light source unit through the nth light source unit not generating light, where k is less than n, and is a positive integer.

In one aspect of the present invention, the area of each of the n display sections is equal.

Compared with the conventional technology, the present invention provides a display device where the backlight module is divided into a plurality of light source units and where the backlight module and the display panel are scanned simultaneously. Whenever a display section of the display panel finishes being scanned, the light source unit which the scanned display section corresponds to illuminates and the light source units which other wait-to-be-scanned display sections correspond to do not illuminate. In this way, images in subsequent frames will not be viewed at the same time before all of the display sections of the display panel finish being scanned. It helps improve 3D image crosstalk and enhance 3D image quality.

These and other features, aspects and advantages of the present disclosure will become understood with reference to the following description, appended claims and accompanying figures.

BRIEF DESCRIPTION OF THE DRAWINGS

FIG. 7 is a process flow diagram of the image shown on the display device shown in FIG. 6.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
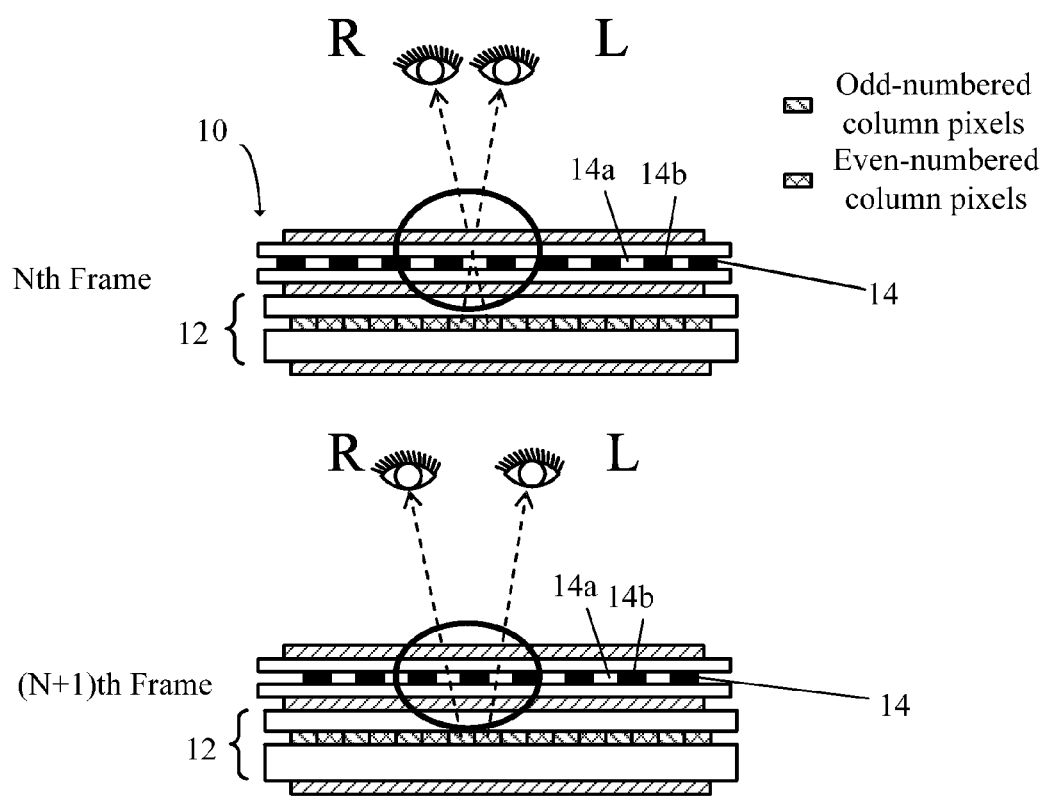
FIG. 1 is a schematic diagram of the status of all pixels while a conventional auto-stereoscopic 3D display device is on display.
Figure 2:
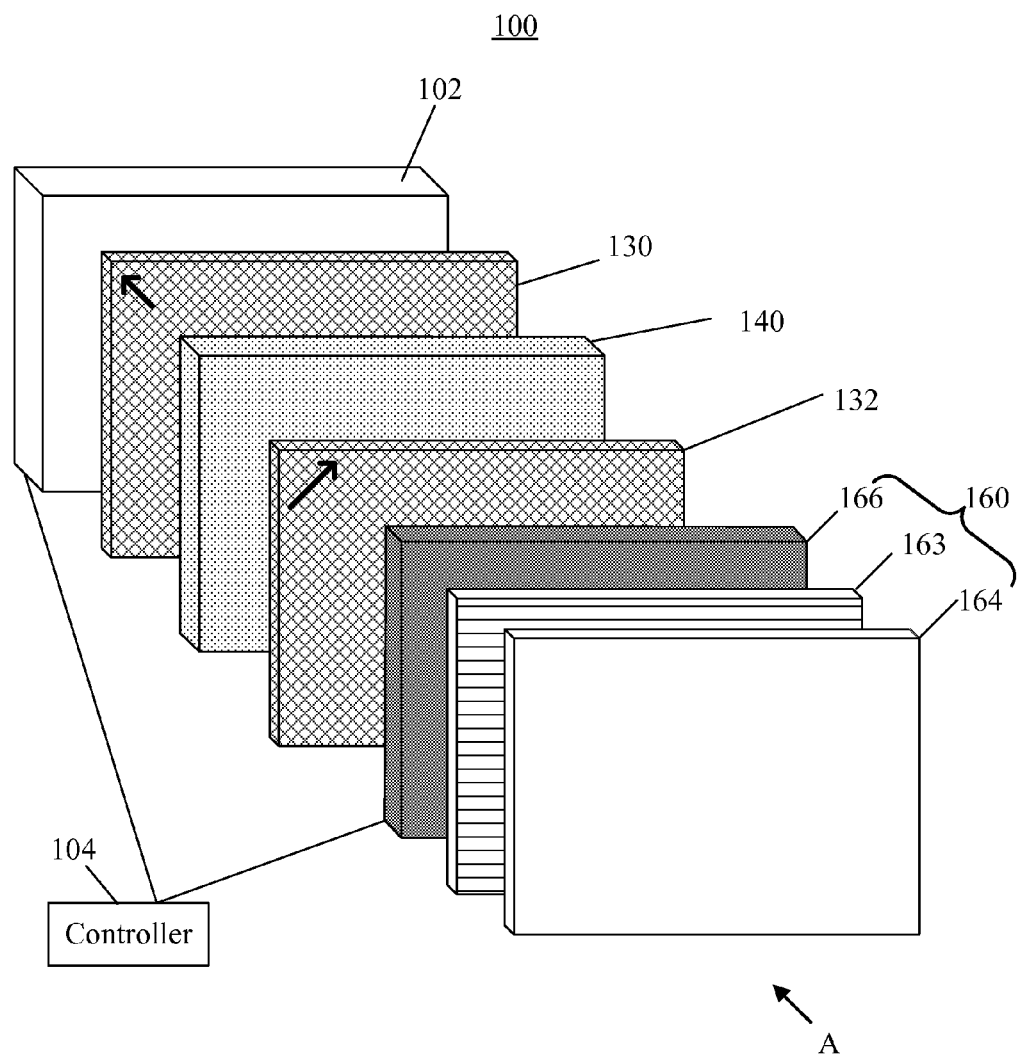
FIG. 2 is a schematic diagram of a stereoscopic image display device showing 3D images according to the present invention.

Please refer to FIG. 2. FIG. 2 is a schematic diagram of a stereoscopic image display device 100 showing 3D images according to the present invention. An observer of the stereoscopic image display device 100 can view 3D images. The stereoscopic image display device 100 comprises a backlight module 102, a controller 104, a first diffuser 130, a display unit section 140, a second diffuser 132, and a grating sheet 160. The backlight module 102 is used for producing light. A light emitting diode (LED) or a cold cathode fluorescent lamp (CCFL) can used as the light source of the backlight module 102. The display unit section 140 can be a liquid crystal panel for showing images. The display unit section 140 comprises a pixel matrix comprising a plurality of pixels. The light produced by the backlight module 102 is emitted to the first diffuser 130. The polarization axis of the first diffuser 130 is set as 135° according to an observer A's viewpoint, so the first diffuser 130 has a function of light transmission of the polarization axis about 135° based on the observer A's viewpoint. The following description is basically according to the observer A's viewpoint; otherwise, other observers' viewpoint will be notified. The polarization axis of the second diffuser 132 is set as 45° according to the observer A's viewpoint, so he second diffuser 132 has a function of light transmission of the polarization axis about 45° based on the observer A's viewpoint.

Figure 3:
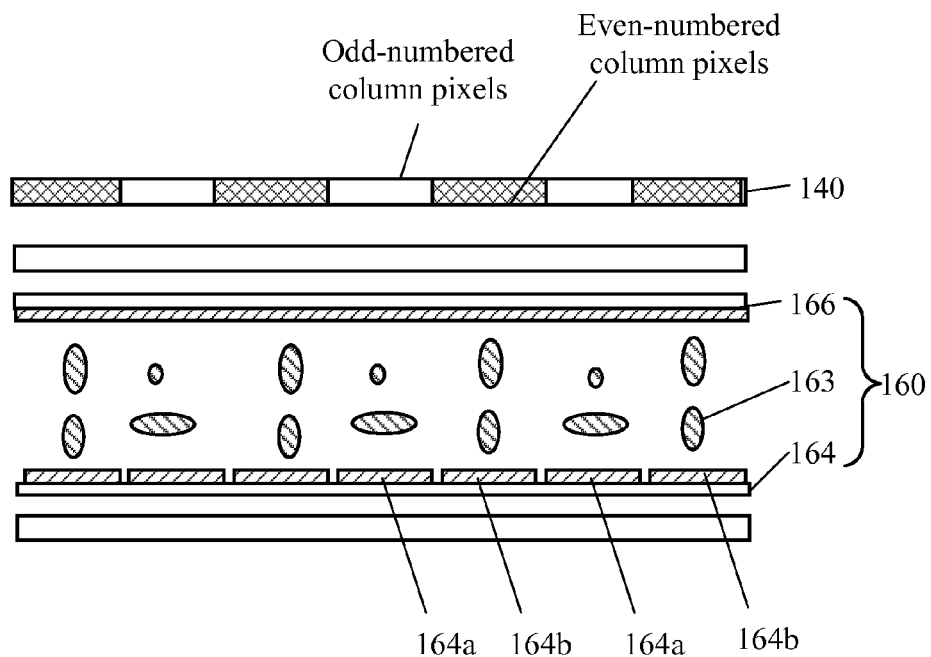
FIG. 3 is a diagram of the structure of the grating sheet in FIG. 2.

Please refer to FIG. 3. FIG. 3 is a diagram of the structure of the grating sheet 160 in FIG. 2. The grating sheet 160 comprises a first electrically conducting layer 164, a second electrically conducting layer 166, and a twisted nematic (TN) layer 163 inserted by the first electrically conducting layer 164 and the second electrically conducting layer 166. The first electrically conducting layer 164 and the second electrically conducting layer 166 are transparent conductive layers. The transparent conductive layers may fabricated from be indium tin oxide (ITO). The first electrically conducting layer 164 comprises a plurality of first transparent electrodes 164a and a plurality of second transparent electrodes 164b. The plurality of first transparent electrodes 164a and the plurality of second transparent electrodes 164b are in parallel. The plurality of first transparent electrodes 164a and the plurality of second transparent electrodes 164b are stripe-like. The plurality of first transparent electrodes 164a and the plurality of second transparent electrodes 164b are alternatively arranged. The plurality of first transparent electrodes 164a and the plurality of second transparent electrodes 164b correspond to the pixels on the odd column of the display unit section 140 and the pixels on the even column of the display unit section 140, respectively. The second electrically conducting layer 166 is coupled to a common voltage terminal Vcom. The TN layer 163 comprises a plurality of TN liquid crystal molecules. The TN liquid crystal molecules determines penetration of the light according to the pressure difference between the first transparent electrode 164a and the second electrically conducting layer 166 and between the second transparent electrode 164b and the second electrically conducting layer 166. For example, the first transparent electrode 164a receives a voltage V (a first turn-on signal) which is larger than the common voltage terminal Vcom and the second transparent electrode 164b receives an electric potential (a second turn-off signal) which is equal to the common voltage terminal Vcom. The TN liquid crystal molecules in the TN layer 163 corresponding to the first transparent electrode 164a rotate according to the pressure difference between the voltage V imposed on the first transparent electrode 164a and the common voltage terminal Vcom imposed on the second electrically conducting layer 166. At this time, the light emitted by the second diffuser 132 penetrates the first transparent electrode 164a. Contrarily, the TN liquid crystal molecules in the TN layer 163 corresponding to the second transparent electrode 164b do not rotate since the voltage V imposed on the second transparent electrode 164b is equal to the common voltage terminal Vcom imposed on the second electrically conducting layer 166. At this time, the light emitted by the second diffuser 132 penetrates the second transparent electrode 164b. On the contrary, the first transparent electrode 164a receives an electric potential (a first turn-off signal) which is equal to the common voltage terminal Vcom and the second transparent electrode 164b receives a voltage V (a second turn-on signal) which is larger than the common voltage terminal Vcom. At this time, the light cannot penetrate the first transparent electrode 164a, but penetrates the second transparent electrode 164b. Based on this principle, the first turn-on signal and the second turn-on signal sent by the controller 104 controls the light to penetrate the first transparent electrode 164a or the second transparent electrode 164b. It shows that the grating sheet 160 controls the pixels on the odd column of the display unit section 140 or the pixels on the even column of the display unit section 140 for human being to view images.

Figure 4:
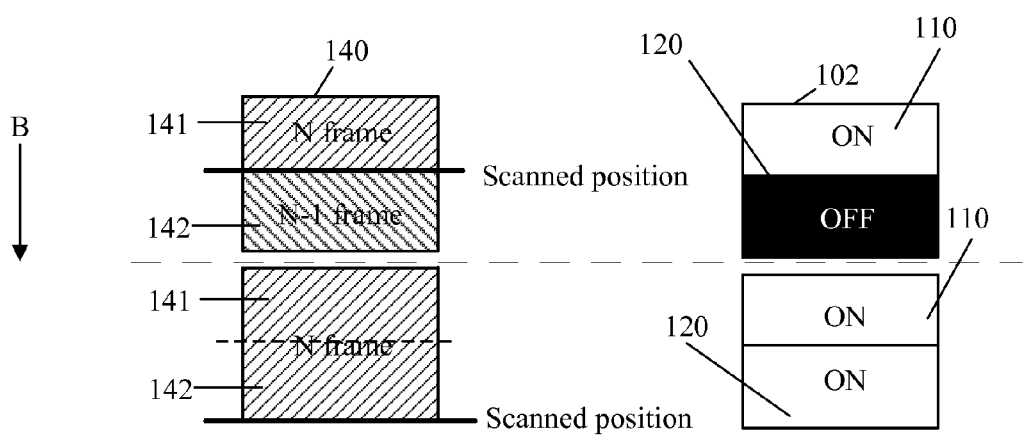
FIG. 4 is a schematic diagram showing the display unit section, the grating sheet, and the backlight module in operation according to a first embodiment of the present invention.

Please refer to FIG. 4. FIG. 4 is a schematic diagram showing the display unit section 140, the grating sheet 160, and the backlight module 102 in operation according to a first embodiment of the present invention. The display unit section 140 is scanned row by row along a direction as an arrow B shows until the final row finishes being scanned. The period of scanning time is called a frame rate. Afterwards, scanning continues again from the first row. In this embodiment of the present invention, the frame rate is set as 120 Hz for demonstration. In reality, the frame rate is not restricted. The backlight module 102 comprises the first light source unit 110 and the second light source unit 120. Preferably, the first light source unit 110 and the second light source unit 120 share half the illuminating area of the backlight module 102, respectively. The display unit section 140 comprises the first display section 141 and the second display section 142. Preferably, the first display section 141 and the second display section 142 share half the area of the display unit section 140, respectively.

Figure 5:
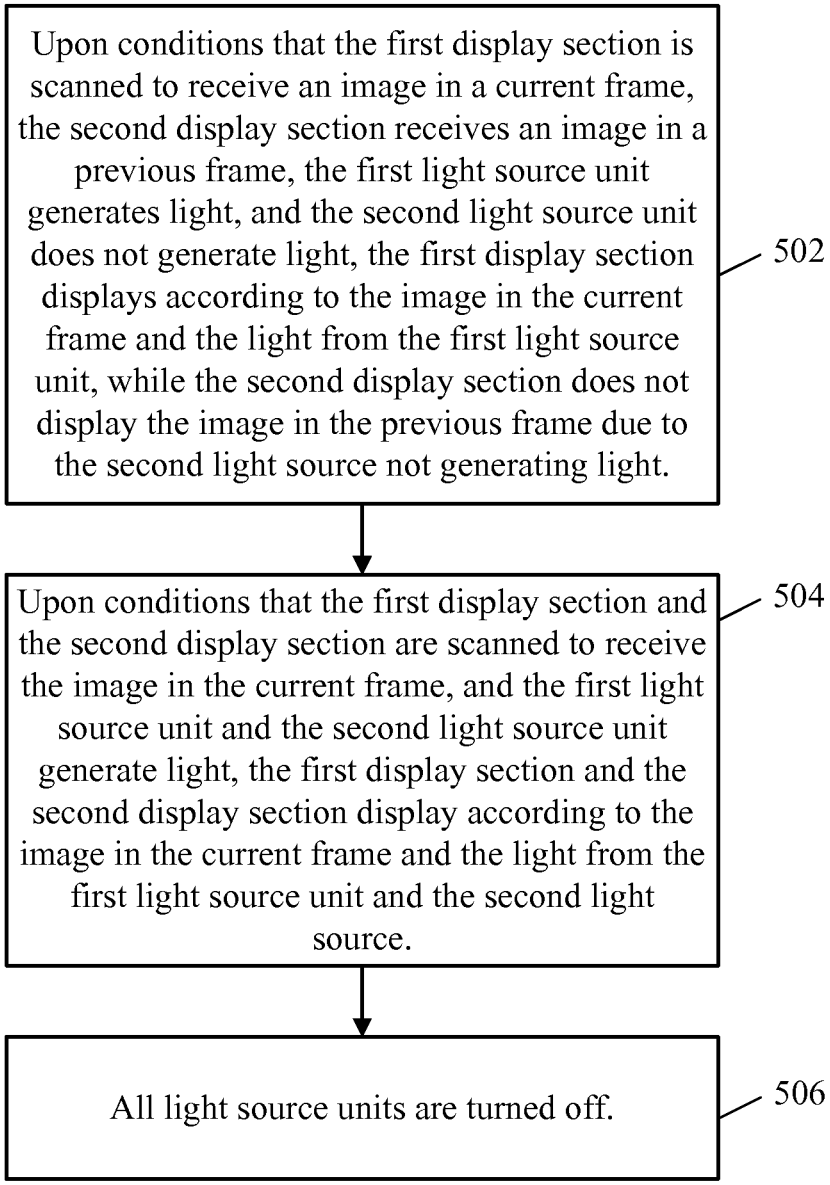
FIG. 5 is a process flow diagram of the image shown on the display device shown in FIG. 4.

Please refer to FIG. 4 and FIG. 5. FIG. 5 is a process flow diagram of the image shown on the display device shown in FIG. 4. In Step 502, the display unit section 140 finishes being scanned halfway. Meanwhile, the first display section 141 receives the image in the Nth frame. The second display section 142 receives the image in the (N−1)th frame as usual. The first light source unit 110 receives the first lighting signal and produces the first light. The first display section 141 shows the image according to the first light. At the same time, the second light source unit 120 does not receive the second lighting signal and does not illumine Although the second display section 142 receives the image in the (N−1)th frame, the image shown on the second display section 142 cannot be seen by the observer because of lack of light.

In Step 504, the first display section 141 and the second display section 142 receive an image in the Nth frame. Meanwhile, the first light source unit 110 receives a first lighting signal for producing a first light. The second light source unit 120 receives a second lighting signal for producing a second light. The first display section 141 and the second display section 142 show the image in the Nth frame according to the first light and the second light.

In Step 506, all of the light source units 110 and 120 are turned off.

The controller 104 is used for outputting every signal for the image in each frame, the first lighting signal, and the second lighting signal precisely. In this way, resolution will not decrease when the observer views the image shown on the display unit section 140. Besides, images with different frames will not be shown on the display unit section 140 at the same time.

Figure 6:
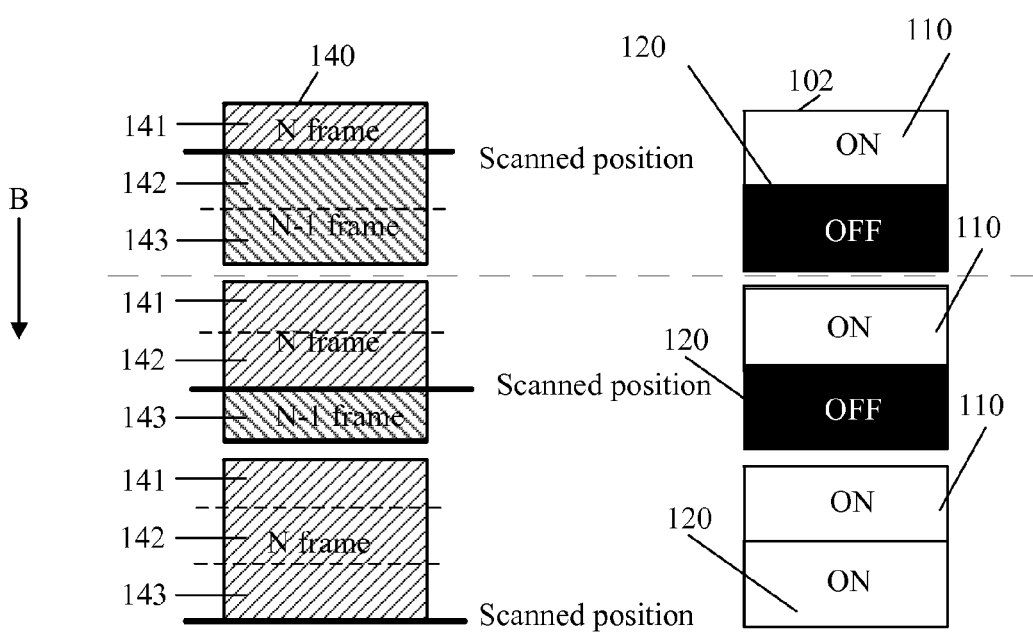
FIG. 6 is a schematic diagram showing a display unit section, a grating sheet, and a backlight module in operation according to a second embodiment of the present invention.

Please refer to FIG. 6. FIG. 6 is a schematic diagram showing a display unit section 140, a grating sheet 160, and a backlight module 102 in operation according to a second embodiment of the present invention. Differing from the first embodiment as FIG. 4 shows, the display unit section 140 in the second embodiment comprises a first display section 141, a second display section 142, and a third display section 143. Preferably, the first display section 141, the second display section 142, and the third display section 143 share one third of the area of the display unit section 140, respectively.

Please refer to FIG. 6 and FIG. 7. FIG. 7 is a process flow diagram of the image shown on the display device shown in FIG. 6. In Step 702, the first display section 141 is scanned. Meanwhile, the first display section 141 receives the image in the Nth frame. The second display section 142 and the third display section 143 receive the image in the (N−1)th frame as usual. The first light source unit 110 receives the first lighting signal and produces the first light. The first display section 141 shows the image in the Nth frame according to the first light. At the same time, the second light source unit 120 does not receive the second lighting signal and does not illumine Although the second display section 142 and the third display section 143 receive the image in the (N−1)th frame, the image shown on the second display section 142 and the third display section 143 cannot be seen by the observer because of lack of light.

In Step 704, the first display section 141 and the second display section 142 receives an image in the Nth frame after the first display section 141 and the second display section 142 finish being scanned subsequently. The third display section 143 receives an image in the (N−1)th frame as usual. Meanwhile, the first light source unit 110 receives a first lighting signal for producing a first light. So the first display section 141 and the second display section 142 show the image in the Nth frame according to the first light. In the meanwhile, the second light source unit 120 fails to receive a second lighting signal so the second light source unit 120 does not produce the second light. Although the third display section 143 receives the image in the (N−1)th frame, the third display section 143 cannot be seen by the observer because of lack of light.

In Step 706, the first display section 141, the second display section 142, and the third display section 143 receive an image in the Nth frame after the first display section 141, the second display section 142, and the third display section 143 finish being scanned subsequently. Meanwhile, the first light source unit 110 receives a first lighting signal for producing a first light. The second light source unit 120 receives a second lighting signal for producing a second light. So the first display section 141, the second display section 142, and the third display section 143 show the image in the Nth frame according to the first light and the second light.

In Step 708, all of the light source units 110 and 120 are turned off.

The controller 104 is used for outputting every signal for the image in each frame, the first lighting signal, and the second lighting signal precisely. In this way, resolution will not decrease when the observer views the image shown on the display unit section 140. Besides, images with different frames will not be shown on the display unit section 140 at the same time.

Figure 8:
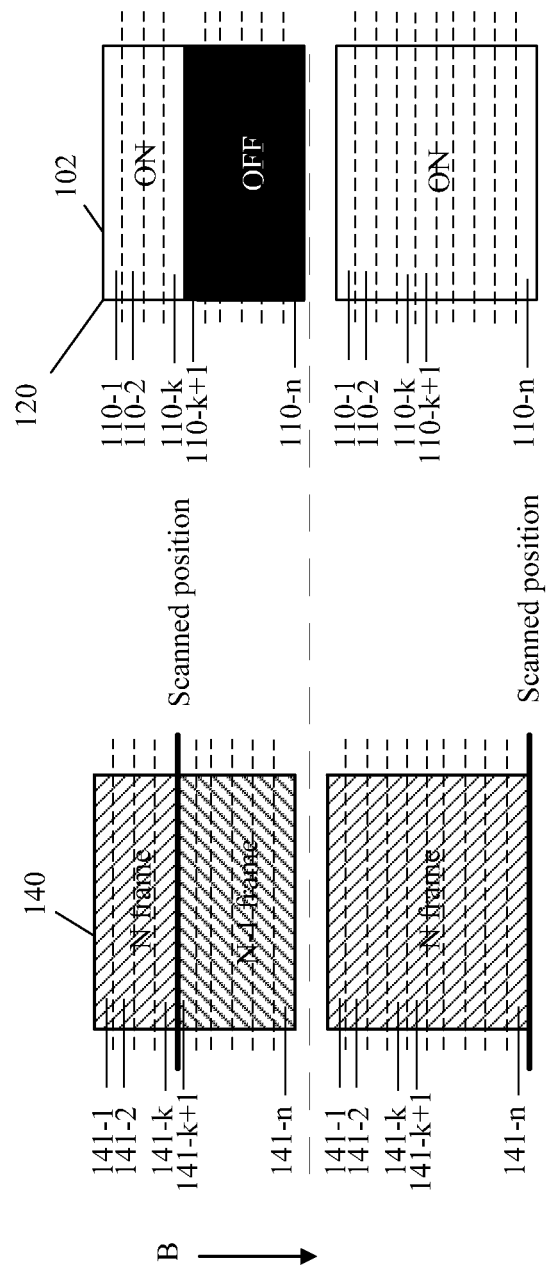
FIG. 8 is a schematic diagram showing a display unit section, a grating sheet, and a backlight module in operation according to a third embodiment of the present invention.

Please refer to FIG. 8. FIG. 8 is a schematic diagram showing a display unit section 140, a grating sheet 160, and a backlight module 102 in operation according to a third embodiment of the present invention. The display unit section 140 is scanned row by row along a direction as an arrow B shows until the final row finishes being scanned. The period of scanning time is called a frame rate. Afterwards, scanning continues again from the first row. The backlight module 102 comprises n light source units 110-1~110-*n* where the n is a positive integer. Preferably, the illuminating range of each of the light source units is equal. The display unit section 140 comprises n display sections 141-1~141-*n*. Preferably, each of the display sections comprises equal display units, and each of the display sections overlaps the illuminating range of one of the light source units.

Whenever a display section finishes being scanned, the light source which the display section corresponds to is turned on simultaneously. The scanning continues until the display unit section 140 finishes being scanned. In other words, the first display section 141-1 to the kth display section 141-*k* are scanned and then receive the image in the Nth frame. While the (k+1)th display section 141-*k*+1 to the nth display section 141-*n* receive the image in the (N−1)th frame, the first light source unit 110-1 to the kth light source unit 110-*k* produce light and the (k+1)th light source unit 110-*k*+1 to the nth light source unit 110-*n* do not produce light. The first display section 141-1 to the kth display section 141-*k* show the image in the Nth frame according to the signal of the image in the Nth frame and the light produced by the first light source unit 110-1 to the kth light source unit 110-*k*. The (k+1)th display section 141-*k*+1 to the nth display section 140-*n* do not show the image in the (N−1)th frame since the (k+1)th light source unit 110-*k*+1 to the nth light source unit 110-*n* do not produce light. After each of the display section shows the image in the Nth frame, all of the light source units will be turned off. After the first display section receives the image in the (N+1)th frame and the first light source unit 110-1 is turned on again, all of the light source units will be turned on.

The display device provided by the present invention is capable of showing different images simultaneously. In other words, the display device provided by the present invention can be used as a stereoscopic image display device which adopts binocular parallax or a display device which adopts right and left display images for the observers to view different images. More specifically, the display device provided by the present invention can serve liquid crystal televisions, liquid crystal displays (LCDs), plasma display panels (PDPs), projectors, notebook computers, medical display devices, global positioning system (GPS) display devices, etc.

Compared with the conventional technology, the present invention provides a display device where the backlight module is divided into a plurality of light source units and where the backlight module and the display panel are scanned simultaneously. Whenever a display section of the display panel finishes being scanned, the light source unit which the scanned display section corresponds to illuminates and the light source units which other wait-to-be-scanned display sections correspond to do not illuminate. In this way, images in subsequent frames will not be viewed at the same time before all of the display sections of the display panel finish being scanned. It helps improve 3D image crosstalk and enhance 3D image quality.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A display device for showing three dimensional (3D) images, comprising:
   a backlight module, comprising a first light source unit and a second light source unit, for producing light; and
   a display unit section, comprising a first display section, a second display section, and a third display section, the first display section overlapping with an illuminating range of the first light source unit, and the second display section overlapping with an illuminating range of the second light source unit;
   wherein upon conditions that the first display section is scanned to receive the image in the current frame, the second display section and the third display section receive the image in the previous frame, the first light source unit generates light, and the second light source unit does not generate light, the first display section displays according to the image in the current frame and the light from the first light source unit, while the second display section and the third display section does not display the image in the previous frame due to the second light source not generating light;
   upon conditions that the first display section and the second display section are scanned to receive the image in the current frame, the third display section receives the image in the previous frame, the first light source unit generates light, and the second light source unit does not generate light, the first display section and the second display section display according to the image in the current frame and the light from the first light source unit, while the second display section and the third display section does not display the image in the previous frame due to the second light source not generating light; and
   upon conditions that the first display section, the second display section and the third display section are scanned to receive the image in the current frame, and the first light source unit and the second light source unit generate light, the first display section, the second display section display and the third display section display according to the image in the current frame and the light from the first light source unit and the second light source.

2. The display device as claimed in claim 1, wherein the first display section, the second display section, and the third display section share one third of the area of the display unit section, respectively.

3. A method of showing three dimensional (3D) images by using a display device, the display device comprising: a backlight module and a display section, the backlight module comprising a first light source unit and a second light source unit, and the display unit section comprising a first display section, a second display section, and a third display section, the method comprising:
   upon conditions that the first display section is scanned to receive the image in the current frame, the second display section and the third display section receive the image in the previous frame, the first light source unit generates light, and the second light source unit does not generate light, the first display section displays according to the image in the current frame and the light from the first light source unit, while the second display section and the third display section does not display the image in the previous frame due to the second light source not generating light;
   upon conditions that the first display section and the second display section are scanned to receive the image in the current frame, the third display section receives the image in the previous frame, the first light source unit generates light, and the second light source unit does not generate light, the first display section and the second display section display according to the image in the current frame and the light from the first light source unit, while the second display section and the third display section does not display the image in the previous frame due to the second light source not generating light; and
   upon conditions that the first display section, the second display section and the third display section are scanned to receive the image in the current frame, and the first light source unit and the second light source unit generate light, the first display section, the second display section display and the third display section display according to the image in the current frame and the light from the first light source unit and the second light source.

* * * * *